US010482002B2

(12) United States Patent
Yim et al.

(10) Patent No.: US 10,482,002 B2
(45) Date of Patent: Nov. 19, 2019

(54) MULTI-LAYER TEST SUITE GENERATION

(71) Applicant: Google LLC, Mountain View, CA (US)

(72) Inventors: Keun Soo Yim, San Jose, CA (US); Iliyan Malchev, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/137,038

(22) Filed: Sep. 20, 2018

(65) Prior Publication Data

US 2019/0026217 A1 Jan. 24, 2019

Related U.S. Application Data

(63) Continuation of application No. 15/245,258, filed on Aug. 24, 2016, now abandoned.

(51) Int. Cl.
*G06F 9/44* (2018.01)
*G06F 11/36* (2006.01)
*G06F 8/00* (2018.01)
*G06F 8/71* (2018.01)
*G06F 9/445* (2018.01)

(52) U.S. Cl.
CPC .......... *G06F 11/3684* (2013.01); *G06F 8/00* (2013.01); *G06F 8/71* (2013.01); *G06F 9/44536* (2013.01); *G06F 11/36* (2013.01); *G06F 11/368* (2013.01); *G06F 11/3692* (2013.01)

(58) Field of Classification Search
CPC .................................................. G06F 11/3684
USPC ......................................................... 717/124
See application file for complete search history.

(56) References Cited

U.S. PATENT DOCUMENTS

| 6,604,209 | B1 | 8/2003 | Grucci et al. |
| 7,809,817 | B2 | 10/2010 | Hillier |
| 7,885,929 | B2 | 2/2011 | Moore, Jr. et al. |
| 8,108,349 | B1 | 1/2012 | Cherukumudi et al. |
| 8,346,897 | B2 | 1/2013 | Jaroker |
| 8,522,083 | B1 | 8/2013 | Cohen et al. |
| 8,601,441 | B2 | 12/2013 | Kaulgud et al. |
| 8,863,085 | B1 * | 10/2014 | Stahlberg ............ G06F 11/3668 717/124 |
| 8,881,092 | B2 | 11/2014 | Cope et al. |
| 8,949,674 | B2 | 2/2015 | Mancoridis et al. |

(Continued)

FOREIGN PATENT DOCUMENTS

WO   2007118271   10/2007

OTHER PUBLICATIONS

James Jones, "Visualization of Test Information to Assist Fault Localization", May 2002, p. 467-477 (Year: 2002).*
Benoit Baudry, "Improving Test Suites for Efficient Fault Localization", May 28, 2006, pp. 82-91 (Year: 2006).*
"Advisory Action", U.S. Appl. No. 15/245,258, dated Apr. 18, 2018, 4 pages.
"Final Office Action", U.S. Appl. No. 15/245,258, dated Feb. 28, 2018, 14 pages.

(Continued)

*Primary Examiner* — Wei Y Zhen
*Assistant Examiner* — Lanny N Ung
(74) *Attorney, Agent, or Firm* — Colby Nipper

(57) ABSTRACT

A system and method for developing a multi-layered test suite for an operating platform including a framework layer and a system layer includes executing a first test suite against a version of the operating platform modified based on a software faults. A first counter is incremented if a first test suite executed against the modified version of the operating platform fails. A second test suite can be executed against the modified version of the operating platform and test cases may be added to the first test suite based on whether the second test suite passes or fails.

20 Claims, 5 Drawing Sheets

(56) References Cited

U.S. PATENT DOCUMENTS

| | | | |
|---|---|---|---|
| 9,043,761 B2 | 5/2015 | Artzi et al. | |
| 9,170,904 B1 | 10/2015 | Lecrone et al. | |
| 9,317,408 B2 | 4/2016 | Szpak | |
| 9,329,978 B2 | 5/2016 | Kadishay | |
| 9,361,211 B2 | 6/2016 | Gupta | |
| 2002/0129338 A1 | 9/2002 | MacDonell et al. | |
| 2003/0009740 A1 | 1/2003 | Lan | |
| 2006/0248405 A1 | 11/2006 | Ponczak et al. | |
| 2007/0061625 A1 | 3/2007 | Acosta et al. | |
| 2007/0124166 A1 | 5/2007 | Van Luchene | |
| 2009/0292941 A1 | 11/2009 | Ganai et al. | |
| 2010/0100871 A1* | 4/2010 | Celeskey | G06F 11/008 717/124 |
| 2011/0022551 A1 | 1/2011 | Dixon | |
| 2013/0152047 A1 | 6/2013 | Moorthi et al. | |
| 2015/0370685 A1* | 12/2015 | Heymann | G06F 11/368 714/38.1 |
| 2018/0060221 A1 | 3/2018 | Yim et al. | |

OTHER PUBLICATIONS

"International Search Report and Written Opinion", PCT Application No. PCT/US2017/048007, dated Nov. 24, 2017, 12 pages.

"Non-Final Office Action", U.S. Appl. No. 15/245,258, dated Sep. 8, 2017, 11 pages.

"Notice of Allowance", U.S. Appl. No. 15/245,258, dated Jul. 3, 2018, 8 pages.

Baudry, et al., "Improving Test Suites for Efficient Fault Localization", ICSE'06, Shanghai, China, May 2006, pp. 82-91.

Jones, et al., "Visualization of Test Information to Assist Fault Localization", College of Computing, Georgia Institute of Technology, May 2002, pp. 467-477.

Yilmaz, et al., "Reliable Effects Screening: A Distributed Continuous Quality Assurance Process for Monitoring Performance Degradation in Evolving Software Systems", IEEE Transactions on Software Engineering, vol. 33, Issue 2, 2007, pp. 124-141.

\* cited by examiner

MULTI-LAYER TEST SUITE GENERATION

RELATED APPLICATION

This application is a continuation of and claims priority to U.S. patent application Ser. No. 15/245,258 filed Aug. 24, 2016 entitled "Multi-Layer Test Suite Generation", the disclosure of which is incorporated by reference herein in its entirety.

TECHNICAL FIELD

The following disclosure relates to testing operating platforms for computing devices.

BACKGROUND

Some operating platforms for computing devices, such as open source operating platforms, can be extended by vendors when implemented on the vendors' devices. Extension can include modifying the source code of the operating platform or extending one or more classes of the operating platform to provide vendor specific functionality. Vendor extension can cause inconsistencies across various implementations of the operating platform that can be undesirable for providers of the operating platform wanting to provide users with a consistent user experience. Inconsistencies across vendor implementations can also create problems for application providers wanting to develop applications directed to the operating platform and not a specific vendor implementation.

Operating platform providers can attempt to address inconsistencies through a compatibility test suite. A compatibility test suite is a set of tests applied to a proposed release version of a vendor device configured to execute the vendor specific implementation of the operating platform. Under agreement between the vendor and the operating platform provider, vendors may be required to certify that the proposed release version of the vendor device passes the compatibility test suite before the vendor releases the version of the vendor device for sale and/or markets the version of the vendor device as a device running, or compatible with, the operating platform.

SUMMARY

In one aspect, a method for developing a test suite for an operating platform includes performing a plurality of iterations. Each of the plurality of iterations corresponds to a selected one of a plurality of software faults. Each iteration can include executing a first test suite, including a first plurality of test cases, against a modified version of the operating platform. The modified version of the operating platform can be created by altering a baseline version of the operating platform to include the selected one of a plurality of software faults. Each iteration can also include incrementing a first counter if executing the first test suite against the modified version of the operating platform results in at least one of the first plurality of test cases failing. Each iteration can also include executing a second test suite, including a second plurality of test cases, against the modified version of the operating platform, and incrementing a second counter if executing the second test suite against the modified version of the operating platform results in at least one of the second plurality of test cases failing. Each iteration can further include incrementing a third counter if executing the second test suite against the modified version of the operating platform results in none of the second plurality of test cases failing. Each iteration can also include determining a ratio of the first counter to a sum of the second and third counters and performing another iteration if the ratio fails to satisfy a first threshold. The method ceases iteration through the plurality of iterations if the ratio satisfies the first threshold.

Various implementations of this aspect may include one or more of the following features. In some implementations, the method executes the second test suite against the modified version of the operating platform if none of the first plurality of test cases fails when executing the first test suite against the modified version of the operating platform. The method can also include, in some implementations, adding a test case to the first plurality of test cases if executing the second test suite against the modified version of the operating platform results in at least one of the second plurality of test cases failing. In some implementations, the method adds the test case to the first plurality of test cases prior to performing the next iteration of the plurality of iterations. The method can also include, in some implementations, flagging the selected one of the plurality of software faults if executing the second test suite against the modified version of the operating platform results in at least one of the second plurality of test cases failing. The method can also include developing a test case based on the based on the flagged selected one of the plurality of software faults and/or adding a test case to the first plurality of test cases based on the flagged selected one of the plurality of software faults.

In some implementations, the method executes the first test suite against the modified version of the operating platform is performed if the first test suite includes at least one test case. The method may perform the next iteration further based on whether a quantity of previously performed iterations fails to satisfy a second threshold, in some implementations.

Other implementations of this aspect include corresponding computer systems, apparatus, and computer programs recorded on one or more computer storage devices, each configured to perform the operations of the method summarized above.

In another aspect, a system for developing a test suite for an operating platform includes a processor and a memory storing instructions that when executed by the processor, cause the processor to perform a plurality of iterative operations. Each of the plurality of iterative operations can include executing a first test suite against a modified version of the operating platform. In some embodiments, the modified version of the operating platform is created by altering a baseline version of the operating platform. Each of the plurality of iterative operations can also include incrementing a first counter if executing the first test suite against the modified version of the operating platform fails. Each of the plurality of iterative operations can also include executing a second test suite against the modified version of the operating platform if executing the first test suite against the modified version of the operating platform passes, incrementing a second counter if executing the second test suite against the modified version of the operating platform fails, and incrementing a third counter if executing the second test suite against the modified version of the operating platform passes. Each of the plurality of iterative operations can also include determining a ratio of the first counter to a sum of the second and third counters, and performing another of the plurality of iterative operations if the ratio fails to satisfy a first threshold. The plurality of iterative operations ceases performance if the ratio satisfies the first threshold.

Various implementations of this aspect may include one or more of the following features. In some implementations, of the plurality of iterative operations further includes adding a test case to the first test suite if executing the second test suite against the modified version of the operating platform fails. In some implementations, adding the test case to the first test suite occurs prior to performing another of the plurality of iterative operations. Each of the plurality of iterative operations may execute the first test suite against the modified version of the operating platform is performed if the first test suite includes at least one test case, according to some implementations. In some implementations, performing another of the plurality of iterative operations is further based on whether a quantity of previously performed iterative operations of the plurality of iterative operations fails to satisfy a second threshold.

In some implementations, altering the baseline version of the operating platform is performed by injecting one of a plurality of software faults into the baseline version.

Other embodiments of this aspect include corresponding methods configured to perform the operations of the processor of the regression testing system according to the instructions stored in the regression testing system's memory.

In another aspect, a method for creating a test suite for an operating platform includes performing a plurality of iterations corresponding to a plurality of software faults, wherein each of the plurality of iterations corresponds to one of the plurality of software faults. Each iteration can include creating a modified version of the operating platform by altering a baseline version of the operating platform by injecting a corresponding one of the plurality of software faults into the baseline version of the operating platform. Each iteration can also include executing a first test suite against the modified version of the operating platform if the first test suite includes at least one test case and incrementing a first counter if executing the first test suite against the modified version of the operating platform fails. If executing the first test suite against the modified version of the operating platform passes, each iteration may execute a second test suite against the modified version of the operating platform, increment a second counter if executing the second test suite against the modified version of the operating platform fails, and add a new test case to the first test suite for the corresponding one of the plurality of software faults if executing the second test suite against the modified version of the operating platform fails. Each iteration can also include incrementing a third counter if executing the second test suite against the modified version of the operating platform passes. The iterations may include determining a ratio of the first counter to a sum of the second and third counters, performing another iteration based on when the ratio fails to satisfy a first threshold, and ceasing performance of the iterations when the ratio satisfies the first threshold.

In some implementations of this aspect, performing another of the iterations is further based on whether a quantity of previously performed iterations of the plurality of iterations fails to satisfy a second threshold. In some implementations, the second threshold is based on a ratio of the previously performed iterations of the plurality of iterations to a total of the plurality of iterations.

Other embodiments of this aspect include corresponding computer systems, apparatus, and computer programs recorded on one or more computer storage devices, each configured to perform the operations of the method summarized above.

The details of one or more implementations are set forth in the accompa-nying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
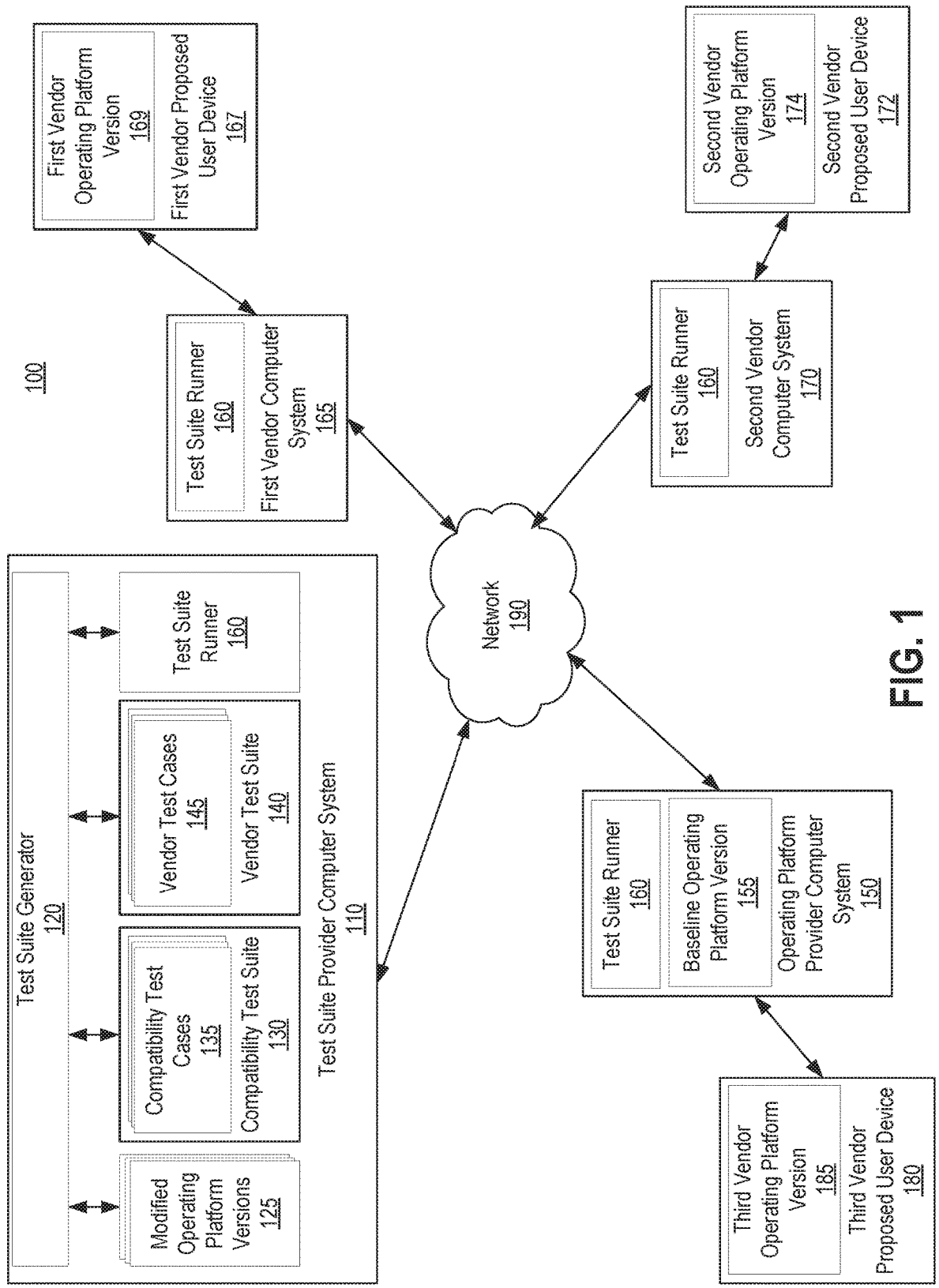
FIG. 1 shows example system and network for multi-layer test suite generation consistent with disclosed embodiments.

An operating platform can include two layers: a system layer and a framework layer. The system layer includes an operating system kernel, libraries for accessing functionality of the operating system kernel, and an abstraction layer for interfacing with hardware. The framework layer includes services that can be used by applications executing on the operating platform and the applications. Conventionally, when testing the operating platform against a compatibility test suite, both the system layer and framework layer are tested together because the compatibility test suite is executed on a proposed release version of the device configured for use by end-users. In such versions, direct access to the system layer may not be possible. For example, the proposed release version of the device may not be "rooted" and/or the system layer may be locked for access by end-users. As a result, system layer functionality for such proposed release versions of devices are tested through calls to the framework layer or applications executing within the framework layer. But, such testing can make it difficult to localize faults because a fault could cause a defect in either the system layer or the framework layer.

Accordingly, the present disclosure describes a process for creating a test suite (referred to as a "first test suite" or "vendor test suite" for ease of discussion) for testing the system layer of the operating platform separate from the framework layer of the operating platform on proposed release versions of vendor devices. In some implementations, the first test suite creation process uses a baseline version of the operating platform and a second test suite (e.g., a compatibility test suite) configured for that baseline version of the operating platform to generate the first test suite.

According to some embodiments, a plurality of software faults are injected into the system layer of the baseline version of the operating platform to create a plurality of modified versions of the operating platform. For each of the plurality of modified versions of the operating platform, the first test suite is executed. If at least one test in the first test suite fails because of the currently injected fault, a first counter is incremented. If, on the other hand, no test in the first test suite fails, then the second test suite is run against the modified version of the operating platform. If the currently injected software fault causes at least one test of the second test suite to fail, a test case corresponding to the currently injected software fault is added to the first test suite or the currently injected software fault is flagged for test case creation (to be added to the first test suite) and a second counter is incremented. On the other hand, if no test in the second test suite fails due to the injection of the current software fault, a third counter is incremented. The process then repeats by accessing another modified version of the operating platform using another software fault. The process is continued for the plurality of software faults (and corresponding modified versions of the operating platform) until the ratio of the first counter to the sum of the second and third counters satisfies a threshold. Once the threshold is satisfied, the first test suite is complete for the baseline version of the operating platform and can be used to test vendor specific implementations extending the baseline version of the operating platform.

FIG. 1 illustrates, in block form, system 100 for multi-layer test suite generation. In the embodiment illustrated in FIG. 1, test suite provider computer system 110, operating platform provider computer system 150, first vendor computer system 165, and second vendor computer system 170 can communicate using network 190. In some embodiments, first vendor proposed user device 167 can communicate with first vendor computer system 165 using a direct connection, local area network, or network 190. Similarly, in some embodiments second vendor proposed user device 172 can communicate with second vendor computer system 170 using a direct connection, local area network, or network 190. And, in some embodiments, operating platform provider computer system 150 can communicate with third vendor proposed user device 180 via direct connection, local area network, or network 190.

In some embodiments, system 100 includes test suite provider computer system 110. Test suite provider computer system 110 can perform functions and operations to generate test suites for testing versions of an operating platform provided by operating platform provider computer system 150. For example, test suite provider computer system 110 may perform functions and operations to generate compatibility test suite 130 and vendor test suite 140 which can be used to test versions of the operating platform, such as baseline operating platform version 155.

In some embodiments, test suite provider computer system 110 includes test suite generator 120. Test suite generator 120 may perform functions and operations for generating compatibility test suite 130 and/or vendor test suite 140, consistent with disclosed embodiments. In some implementations, test suite generator 120 may create, access, and/or use modified operating platform versions 125 for developing compatibility test suite 130 and vendor test suite 140. For example, as described in further detail below, test suite generator 120 may execute compatibility test suite 130 and/or vendor test suite 140 against the modified operating platform versions 125 to modify and/or create vendor test suite 140. In some embodiments, test suite provider computer system 110 can include a copy of test suite runner 160 which test suite generator 120 may access and/or communicate with during test suite generation. Embodiments of test suite runner 160 are discussed below.

In some embodiments system 100 includes operating platform provider computer system 150 which can communicate with remote computer systems via network 190 to provide versions of the operating platform. For example, operating platform provider computer system 150 may communicate, via network 190, baseline operating platform version 155 to first vendor computer system 165, second vendor computer system 170, or test suite provider computer system 110. In some embodiments, test suite provider computer system 110 and operating platform provider computer system 150 are maintained and controlled by the same entity, for example, the operating platform provider. And, in some embodiments the functions and operations of test suite provider computer system 110 may be performed by operating platform provider computer system 150. According to some embodiments, system 100 may also include first vendor computer system 165 and second vendor computer system 170. First vendor computer system 165 and second vendor computer system 170 may be respectively operated by vendors that manufacture, distribute, and/or sell user computing devices executing a version of the operating platform.

In some embodiments, baseline operating platform version 155 is open source and modifiable by multiple vendors manufacturing user devices running the operating platform. The multiple vendors may obtain baseline operating platform version 155 and modify it for deployment on user devices manufactured by the vendors that the vendors plan to release for sale (called herein "proposed user devices" for simplicity). For example, a first vendor can obtain baseline operating platform version 155 using first vendor computer system 165. The first vendor may modify baseline operating platform version 155 to create first vendor operating platform version 169, which is deployed on to first vendor proposed user device 167. Similarly, a second vendor can obtain baseline operating platform version 155 using second vendor computer system 170. The second vendor may modify baseline operating platform version 155 to create second vendor operating platform version 174, which is deployed to second vendor proposed user device 172. In some embodiments, first vendor operating platform version 169 and second vendor operating platform version 174 differ. In some embodiments, a vendor may modify baseline operating platform version 155 and deploy it on a proposed user device, and the third vendor may provide its proposed user device to the operating platform provider for testing. For example, as shown in FIG. 1, a third vendor—which can modify baseline operating platform version 155 to create third vendor operating platform version 185—can provide third vendor proposed user device 180 to the operating platform provider for testing.

According to some embodiments, operating platform provider computer system 150 can include baseline operating platform version 155. Baseline operating platform version 155 can include source code and or executable code of the latest stable version of the operating platform. For example, baseline operating platform version 155 can include source code and/or executable code for a version of the operating platform that has completed verification and validation testing and released to vendors and/or the public as a stable version of the operating platform as provided by the developer of the operating platform without modifications from third parties. For example, if vendors are designing and or manufacturing user devices for version 4.5 of the operating platform, baseline operating platform version 155 may be version 4.5 of the operating platform as provided by the operating platform provider without modification from any vendor or other third party. As indicated above, vendors may obtain a copy of baseline operating platform version 155 and modify it for deployment to their respective proposed user devices. Accordingly, vendor modified versions of the operating platform—such as first vendor operating platform version 169, second vendor operating platform version 174, and third vendor operating platform version 185 may differ from baseline operating platform version 155.

In some embodiments, operating platform provider computer system 150 includes test suite runner 160. Test suite runner 160 can perform functions and operations to execute one or more test suites against a modified version of baseline operating platform version 155. According to some embodiments, test suite runner 160 can access an application programming interface (API) exposed by baseline operating platform version 155 which allows test suite runner 160 to interface with baseline operating platform version 155 to execute one or more test cases of a test suite. For example, test suite runner 160 may interface with an API of baseline operating platform version 155 to run compatibility test suite 130 or vendor test suite 140.

In some embodiments, operating platform provider computer system 150 provides, via network 190, a copy of test suite runner 160 to computer systems of vendors developing user devices executing the operating platform. For example, a first vendor may obtain a copy of test suite runner 160 from operating platform provider computer system 150 and run compatibility test suite 130 and/or vendor test suite 140 against first vendor proposed user device 167 to test first vendor operating platform version 169. Similarly a second vendor can obtain test suite runner 160 from operating platform provider computer system 150 to test second vendor operating platform version 174 deployed onto second vendor proposed user device 172. According to some embodiments, operating platform provider computer system 150 may use test suite runner 160 to test proposed user devices of vendors. For example as shown in FIG. 1, operating platform provider computer system 150 may use test suite runner 160 to test third vendor operating platform version 185 which has been deployed to third vendor proposed user device 180.

System 100 outlined in FIG. 1 can be computerized, wherein each of the illustrated components comprises a computing device that is configured to communicate with other computing devices via network 190. For example, test suite provider computer system 110 can include one or more computing devices, such as a desktop, notebook, or handheld computing device that is configured to transmit and receive data to/from other computing devices via network 190. Similarly, operating platform provider computer system 150, first vendor computer system 165, and second vendor computer system 170 can include one or more computing devices that are configured to communicate data via network 190. For example, operating platform provider computer system 150, first vendor computer system 165, and second vendor computer system 170 can include one or more servers or computing clusters. In some embodiments, these computing systems can be implemented using one or more computing devices dedicated to performing the respective operations of the systems as described herein.

Depending on the embodiment, network 190 can include one or more of any type of network, such as one or more local area networks, wide area networks, personal area networks, telephone networks, and/or the Internet, which can be accessed via any available wired and/or wireless communication protocols. For example, network 190 can comprise an Internet connection through which test suite provider computer system 110 and first vendor computer system 165 communicate. Any other combination of networks, including secured and unsecured network communication links are contemplated for use in the systems described herein.

Figure 2:
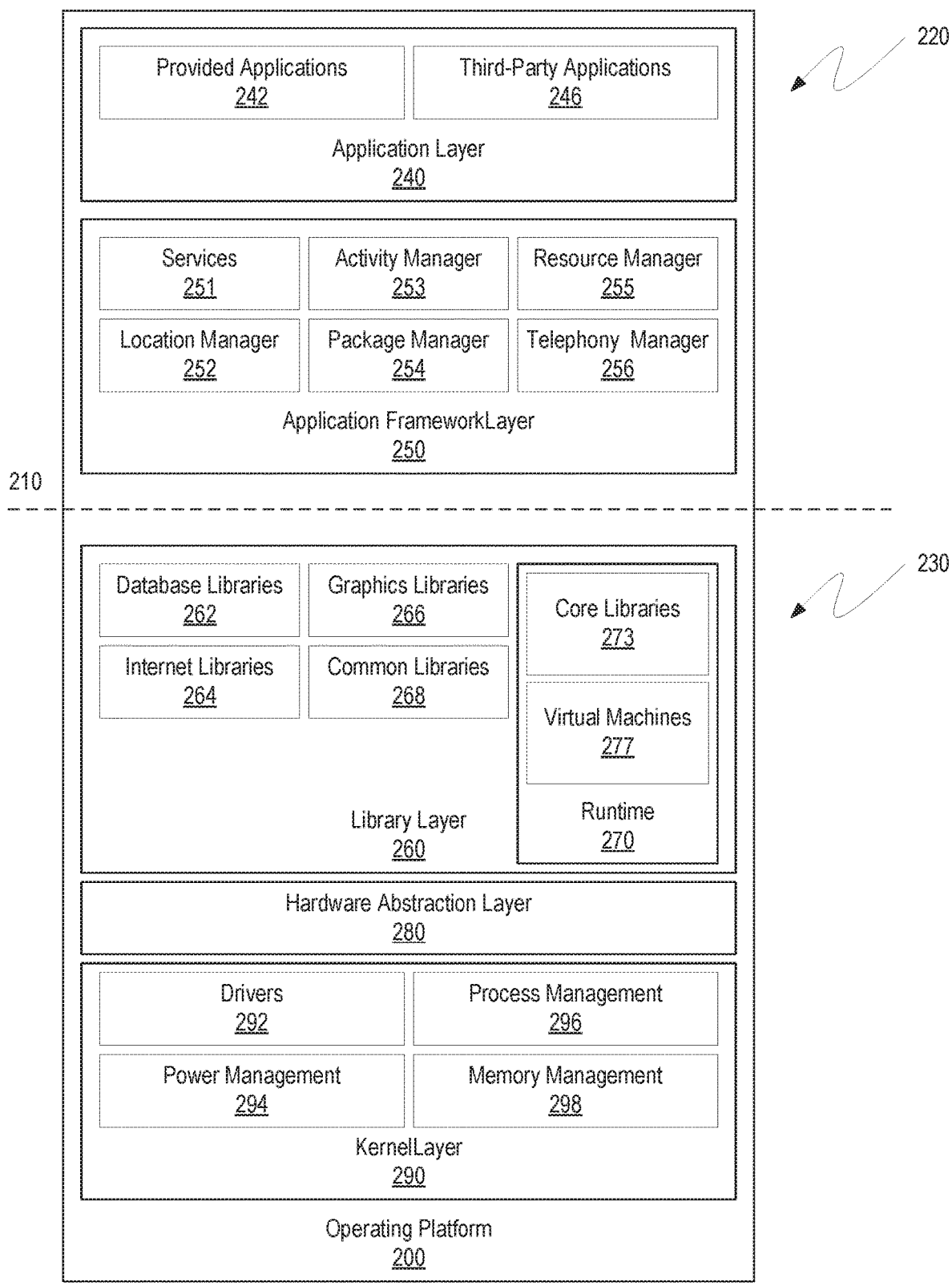
FIG. 2 shows an example architecture for an operating platform consistent with disclosed embodiments.

FIG. 2 shows an example architecture diagram for operating platform 200 consistent with disclosed embodiments. In some embodiments, operating platform 200 can be an open source operating platform, that the source code for the operating platform may be available to third parties installing the operating platform on computing devices and/or the public. Operating platform 200 can include, in some embodiments, a general-purpose operating system executing on a general-purpose computing device such as a laptop, desktop, or other general-purpose computing device, or a mobile computing device such as a mobile phone, smartphone, or tablet computing device. Operating platform 200 may support basic functions of the computing device such as scheduling tasks, executing applications, controlling peripheral devices, and/or managing resources of the general-purpose computing device.

In some embodiments, operating platform 200 includes several abstraction layers which can be divided into upper abstraction layers and lower abstraction layers. For example, operating platform 200 as shown in FIG. 2, is divided along line 210 into an upper abstraction layer, or framework layer 220, and a lower abstraction layer, or system layer 230.

In some embodiments, framework layer 220 can include two sublayers, for example, application layer 240 and application framework layer 250. Applications layer 240 can include, in some embodiments, an application or user space in which user applications such as provided applications 242 and third-party applications 246 execute. For example, provided applications 242 can include applications such as an email client, a phone application, a web browser application, and/or a notetaking application. Third-party applications 246 can include applications that a user downloads and installs from third-party application providers. Third-party applications 246 can include, for example, word processing applications, spreadsheet applications, social media applications, and games. In some embodiments, users of the computing device executing operating platform 200 have direct access to the functionality of application layer 240.

According to some embodiments, applications installed within application layer 240 can interface with services or managers in application framework layer 250 to access functionality provided by system layer 230. Users, in some embodiments, may not access application framework layer 250, but rather, may access it indirectly through the applications of application layer 240. For example, application framework layer 250 can include various services 251 that can be used by applications installed in application layer 240, such as input output services, Bluetooth services, or database services as just some examples. In some embodiments, application framework layer 250 may also include various managers such as location manager 252 activity manager 253, package manager 254, resource manager 255, and telephony manager 256 which may manage one or more background processes (e.g., processes without a user interface). For example, location manager 252 may provide an API that provides applications executing within application layer 240 with location information (such as GPS coordinates) regarding the current location of the device executing operating platform 200. Activity manager 253, for example, may provide information to applications executing within application layer 240 regarding threads, processes or other resources of the device executing operating platform 200. Package manager 254, in some embodiments, may provide functionality for installing, uninstalling, upgrading, or configuring applications installed within application layer 240. In some embodiments, resource manager 255 may provide functionality for managing resources such as CPU execution cycles or memory. In some embodiments, operating platform 200 provides an application allowing telephone calls over an IP network or over a cellular network and in such embodiments application framework layer 250 may include telephony manager 256 that provides functionality to the telephone application.

In some embodiments, system layer 230 includes three sublayers, library layer 260, hardware abstraction layer 280, and kernel layer 290. In some embodiments, library layer 260 includes one or more libraries that provide common functionality to applications within application layer 240 or services or managers located within application framework layer 250. For example, library layer 260 can include database libraries 262 which provide libraries for accessing and utilizing databases executing on operating platform 200. Library layer 260 can also include Internet libraries 264 which can provide functionality to application layer 240 or application framework layer 250 for using Internet protocols. According to some embodiments, library layer 260 can also include graphics library 266 which can provide functionality for rendering graphics on the display of the device executing operating platform 200. Common libraries 268 can include, for example, common functionality that may be used by application layer 240 or application framework layer 250. Such common functionality might include, for example, interprocess communication libraries, input/output libraries, or data management libraries. In some embodiments, library layer 260 can include runtime 270. Runtime 270 may include core libraries 273 and virtual machines 277 which provide functionality to the computing device executing operating platform 200 to execute services, managers (in application framework layer 250) and applications (in application layer 240). For example, in some embodiments, applications within application layer 240 may execute on in one or more virtual machines, and in such embodiments, these one or more virtual machines may be located within runtime 270 of library layer 260.

In some embodiments, system layer 230 of operating platform 200 includes hardware abstraction layer 280. Hardware abstraction layer 280 can provide, in some embodiments, an abstraction layer between the physical hardware of the computing device executing operating platform 200 and the software running on the computing device.

System layer 230 can also include kernel layer 290. Kernel layer 290 can provide functionality for the central core of operating platform 200. For example, kernel layer 290 can provide functionality for managing startup of operating platform 200, input/output requests from application layer 240 and application framework layer 250 (e.g., via drivers 292), management of process start-up and termination (via process management 296), management of power (via power management 294), and management of memory operations (via memory management 298). In some embodiments, application layer 240 and application framework layer 250

When testing the user device executing operating platform 200, one or more test suites may be used. But, the point of entry for these test suites is typically in either application layer 240 or application framework layer 250 because testing generally occurs on devices that are ready for user use, and access to system layer 230 may be prevented. As a result, if the execution of a test case on operating platform results in a defect, it may be difficult to identify the location of the fault causing the defect within operating platform 200. For example, if a test case makes a call on an application that uses telephone resources, and the test case triggers a defect, it may be difficult to determine whether the fault causing the defect is located within application layer 240 (or provided applications 242), within application framework layer 250 (or within telephony manager 256), within library layer 260 (or one of common libraries 268, core libraries 273, virtual machines 277), within hardware abstraction layer 280, or kernel layer 290. Therefore, the disclosed embodiments describe a process for creating a test suite designed to test the functionality of system layer 230 separate from functionality of framework layer 220, without having to system layer 230.

Figure 3:
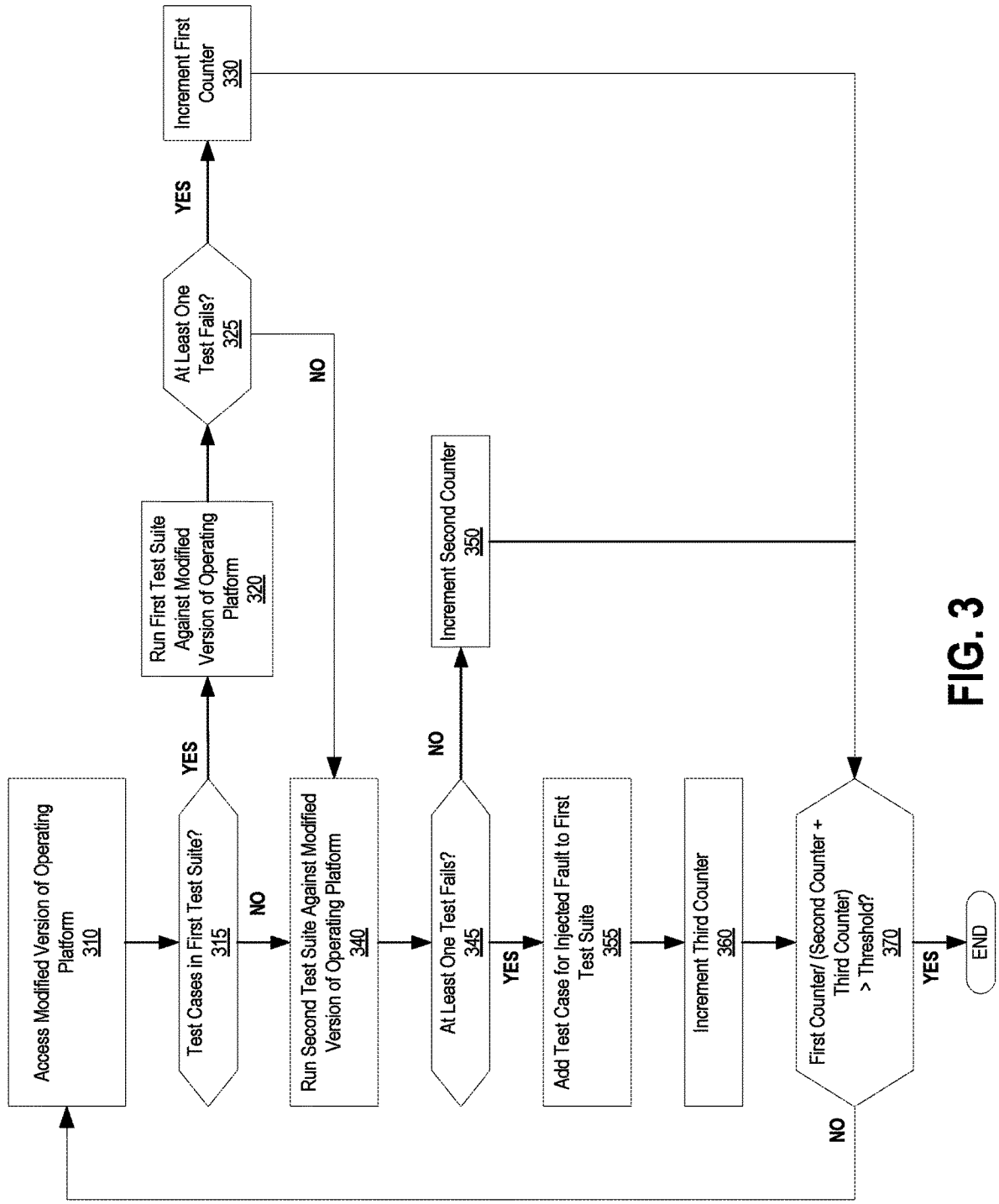
FIG. 3 shows a flow chart for a process for multi-layer test suite generation consistent with disclosed embodiments.

FIG. 3 shows a flowchart representing an example test suite generation process 300 for performing multi-layer test suite generation. According to some embodiments, test suite generation process 300 can be performed by one or more components of a test suite provider computer system 110 such as test suite generator 120. Although the following discussion describes test suite generation process 300 as being performed by a test suite generator, other components of a computer system configured to perform test suite generation, such as test suite provider computer system 110, can perform test suite generation process 300 without departing from the spirit and scope of the present disclosure.

A test suite generator can perform test suite generation process 300 to create and add test cases to a first test suite that can be used to test the system layer of an operating platform independent from the framework layer of the operating platform. The first test suite can be, for example, vendor test suite 140. In some embodiments, test suite generation process 300 generates test cases to add to the first test suite by executing the test cases already part of the first test suite and a second test suite—which tests both the framework layer and the system layer of the operating platform—on versions of the operating platform that have been modified to include one or more faults that may result in a software defect. The second test suite can be, for example, compatibility test suite 130.

In some embodiments, test suite generation process 300 is an iterative process, and each iteration can correspond to a modified version of the operating platform that has been modified by injecting one fault into a baseline version of the operating platform. In such embodiments, there may be a one-to-one correspondence between an injected fault and a modified version of the operating platform. In some embodiments, one iteration of the test suite generation process 300 corresponds to one injected fault and one modified version of the operating platform and one iteration of the test suite generation process 300 may further correspond to one test case designed to execute the code at the location where the fault was injected. The correspondence between the injected fault, the modified version of the operating platform and/or the test case for the injected fault may be stored in a data structure or database within memory accessible by the test suite generator (e.g., the memory of test suite provider computer system 110). Furthermore, the modified versions of the operating platform (each corresponding to an injected fault) and the test cases may also be stored in a data structure or database within memory accessible by the test suite generator. In some embodiments, the test suite generator may perform test suite generation process 300 for all modified operating platforms that are stored within memory it can access. For example, if the test suite provider computer system has two-hundred different versions of the baseline operating platform version that have been modified by injecting two-hundred separate faults into the baseline operating platform version, the test suite generator may perform test suite generation process two-hundred times.

In some embodiments, the test suite generator may perform test suite generation process 300 until a test suite threshold indicating that a sufficient number of test cases have been generated. In some embodiments, the test suite threshold value may represent a percentage or ratio (referred to as a "test suite ratio" for convenience) corresponding to the count of injected faults causing at least one test case from the first test suite to fail compared to a sum of the count of injected faults causing at least one test case from the second test suite to fail and the count of the injected faults causing no test case from the second test suite to fail (or the number of times the second test suite is executed against a modified version of the operating platform). For example, the test suite threshold value may be 0.90, the number of injected faults resulting in at least one test case from the first test suite failing may be 72, the count of the injected faults causing at least one test case from the second test suite to fail may be 45, and the count of the injected faults causing no test case from the second test suite to fail may be 40. In such an example, the test suite generator will continue performing iterations of test suite generation process 300 because it will calculate the test suite ratio as 0.847 (72/(45+40)) which is lower than the test suite threshold value of 0.90.

In addition to calculating the test suite ratio and comparing it to the test suite threshold, the test suite generator may also use a second threshold corresponding to the number of times test suite generator process 300 has been executed (referred to as a "sample count threshold" for convenience) to ensure that a significant number of test cases have been added to the first test suite. For example the sample count threshold may be 500, the test suite generator may calculate the test suite ratio as 0.95, the test suite threshold may be 0.75, and the test suite generator may have performed test generation process 378 times (resulting in a sample count value of 378). In such an example, a test suite generator will continue to iterate through test suite generation process 300 even though the test suite threshold has been satisfied because the sample count threshold has not.

According to some embodiments, a test suite generator may begin an iteration of test suite generation process 300 at step 310 where the test suite generator accesses a modified version of the operating platform at step 310. In some embodiments, the test suite generator accesses the modified version of the operating platform from a data store of a test suite provider computer system, such as test suite provider computer system 110. In such embodiments, developers may have created the modified versions of the operating platform by modifying the source code for baseline version of the operating platform and saving it to memory of the test suite provider computer system.

Figure 4:
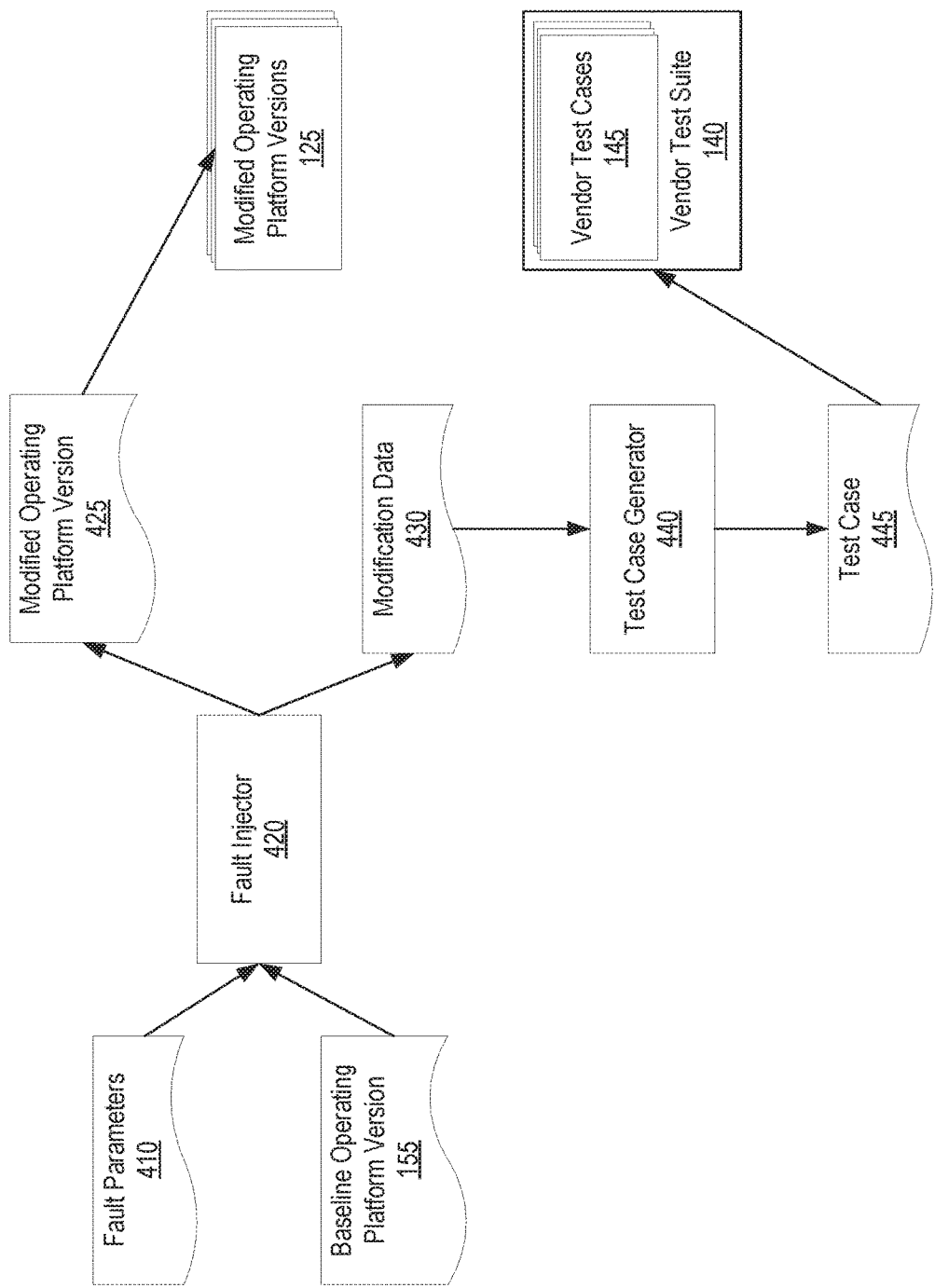
FIG. 4 shows a data flow diagram for injecting software faults consistent with disclosed embodiments.

In some embodiments, the test suite generator can create the modified version of the operating platform by injecting faults into the baseline version of the operating platform using automatic fault injection techniques. For example, FIG. 4 shows one embodiment of a data flow for injecting software faults into a baseline version of the operating platform. In some embodiments, the test suite generator includes or communicates with fault injector 420. Fault injector 420 can be a process, application, service, or other executable software component capable of modifying a code base so that the modified code base includes a fault intended to model a software defect during testing such as a data calculation defect or memory access defect. Fault injector 420, in some embodiments, can perform software fault injections such as compile time injection, where source code is modified to create the fault. For example, fault injector 420 can inject a fault by modifying an operator in the source code such as changing a sum operation to a difference operation (e.g., changing total=A+B to total=A−B). As another example, fault injector 420 can inject faults causing null pointers such as by modifying source code to not allocate memory for a particular variable, or forcibly setting a pointer value to null prior to a call to that variable. In some embodiments, fault injector 420 can be a third-party tool such as beSTORM, LFI, Xception, and ExhaustiF as just some examples.

According to some embodiments, fault injector 420 accesses or receives fault parameters 410 and baseline operating platform version 155. Fault parameters 410 can include information used by fault injector 420 to inject faults into baseline operating platform version 155. Using fault parameters 410, fault injector 420 can create a modified operating platform version 425 which can be stored in memory with one or more other modified operating platform versions 125. Modified operating platform versions 125 may be accessed by test suite generation process 300 at step 310. In some embodiments, fault injector 420 may also produce modification data 430. Modification data 430 can include information about the faults injected into modified operating platform version 425 to facilitate generation of a test case for triggering the fault. For example, modification data 430 may include the file and line number of the modification, a function call that will trigger the fault in modified operating platform version 425, or inputs that will cause execution of the code location where the fault was injected.

In some embodiments, test suite generator 120 can include or communicate with test case generator 440. Test case generator 440 can perform functions and operations that create test cases based on modification data 430. For example, test case generator 440 can include scripts to generate executable code which can make calls to functions or methods identified in modification data 430. In such embodiments, test case generator 440 can receive modification data 430 and generate test case 445. Test case 445 may be stored in a memory accessible by a test suite generator so that the test suite generator can add test case 445 to the first test suite, such as vendor test suite 140, when appropriate based on execution of test suite generation process 300. According to some embodiments, the test suite generator may maintain or access a database linking fault parameters 410, modified operating platform version 425, modification data 430 and/or test case 445 so that when the test suite generator performs test suite generation process 300, it has a link between the modified operating platform used when performing test suite generation process 300, and the test case to add to the first test suite consistent with the execution of the iteration of test suite generation process 300 corresponding to the modified operating platform.

With reference back to FIG. 3, test suite generator 120 continues performance of test suite generation process 300 at step 315 where it determines whether the first test suite already includes test cases. In some embodiments, the first test suite may not yet include test cases when reaching step 315. This may occur, for example, when the test suite generator has begun to develop the first test suite and only performed a few iterations of test suite generation process 300. If there are no test cases in the first test suite (step 315: NO), then the test suite generator will run the second test suite against the modified version of the operating platform at step 340. On the other hand, if there are test cases in the first test suite (step 315: YES) the test suite generator will run the first test suite against the modified version of the operating platform at step 320.

In some embodiments, if performance of step 320 results in at least one test case from the first test suite failing, (step 325: YES) the test suite generator may increment a first counter at step 330. The first counter may correspond to the number of times an injected fault results in at least one test of the first test suite failing. In some embodiments, the test suite generator uses the first counter, along with a second and third counter (described in more detail below) to calculate a test suite value that is compared to a test suite threshold to determine whether the test suite generator should continue iterating through test suite generation process 300 (at step 370). If the test suite threshold is satisfied (step 370: YES), the test suite generator performs no more iterations of test suite generation process 300, and test suite generation process 300 ends. If however, the test suite threshold value is not satisfied (step 370: NO), then the test suite generator performs test suite generation process 300 again by returning to step 310. In some embodiments, and as shown in FIG. 3, when at least one test fails from the first test suite, the test suite generator will not execute any test cases from the second test suite against the modified version of the operating platform being tested and execution will proceed to the next iteration (and the next modified version of the operating platform) or terminate based on the outcome of step 370.

In some embodiments, when execution of step 340 results in no test case from the second test suite failing (step 345: NO), the test suite generator may increment a second counter at step 350. In some embodiments, the second counter may correspond to the number of injected faults that resulted in no test case failing from the second test suite (and by extension the first test suite as well). Once the test suite generator increments the second counter at step 350, it may continue execution of test suite generation process 300 at step 370 where it compares the test suite ratio to the test suite threshold. If the test suite threshold is satisfied, the test suite generator will cease execution of test suite generation process 300. On the other hand, if the test suite threshold has not been satisfied, then the test suite generator will perform the next iteration of test suite generation process 300 on the next modified version of the operating platform based on different injected fault than the current iteration.

According to some embodiments, if at least one test case from the second test suite fails (step 345: YES), then the test suite generator will add a test case to the first test suite corresponding with the fault that was injected into the modified version of the operating platform. For example, if execution of a test case from the second test suite results in an ArrayOutOfBounds Exception, the test suite generator may determine a test case corresponding to the injected fault causing the ArrayOutOfBounds Exception. In some embodiments, the test suite generator may reference a data structure that maps the modified version of the operating platform to a test case that was generated by a test case generator based on output from a fault injector when the fault injector injected the fault causing the ArrayOutOfBounds Exception (e.g. as described above with respect to FIG. 4). In some embodiments, the modified version of the operating platform of the current iteration (and its associated injected fault and/or modification data 430) is flagged for a developer to create a test case corresponding to the injected fault. After the developer creates the test case, the test suite generator may add it to the first test suite.

In some embodiments, when at least one test of the second test suite fails (step 345: YES), the test suite generator may increment a third counter corresponding to the number of times an injected fault resulted in a test case from the second test suite failing (at step 360). After incrementing the third counter, the test suite generator may compare the test suite ratio (the ratio of the first counter to the sum of the second and third counters) to determine whether it satisfies the test suite threshold at step 370. If the test suite threshold is satisfied (step 370: YES), the test suite generator ends execution of test suite generation process 300 but if the threshold is not satisfied (step 370: NO) then the test suite generator perform the next iteration of test suite generation process 300 using the next modified version of the operating platform corresponding to another injected fault. As mentioned above, the test suite generator may perform test suite generation process 300 until either the threshold is satisfied at step 370 or it has performed test suite generation process 300 for all modified operating platforms stored within the memory of test suite provider computer system 110.

In some embodiments, the test suite generator may also compare a sample count (corresponding to the number of times it has executed test suite generation process 300) with a sample count threshold. The test suite generator may use this comparison in addition to the comparison of step 370 to determine whether additional iterations of test generation suite process 300 need to be performed.

Figure 5:
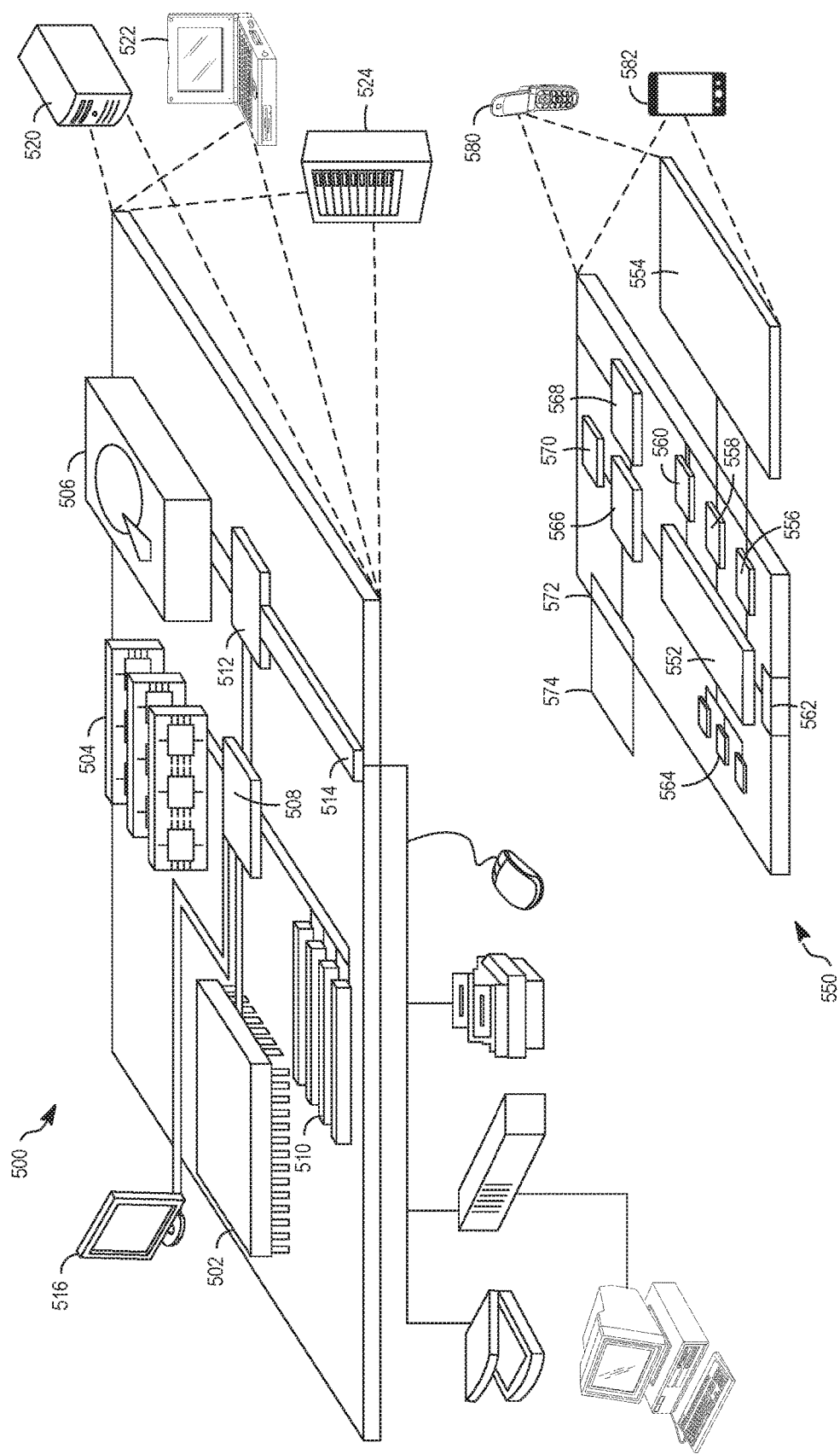
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, tablets, workstations, personal digital assistants, televisions, servers, blade servers, mainframes, and other appropriate computing devices. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low-speed interface 512 connecting to low-speed bus 514 and storage device 506. The processor 502 can be a semiconductor-based processor. The memory 504 can be a semiconductor-based memory. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low-speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for developing a test suite for an operating platform, the method comprising:
    performing a plurality of iterations, each of the plurality of iterations corresponding to a selected one of a plurality of software faults, each iteration including:
        executing a first test suite against a modified version of the operating platform corresponding to the selected one of a plurality of software faults, the first test suite including a first plurality of test cases;
        incrementing a first counter if executing the first test suite against the modified version of the operating platform results in at least one of the first plurality of test cases failing;
        executing a second test suite against the modified version of the operating platform, the second test suite including a second plurality of test cases;
        incrementing a second counter if executing the second test suite against the modified version of the operating platform results in at least one of the second plurality of test cases failing;
        incrementing a third counter if executing the second test suite against the modified version of the operating platform results in none of the second plurality of test cases failing;
        determining a ratio of the first counter to a sum of the second and third counters;
        performing another iteration of the plurality of iterations if the ratio fails to satisfy a first threshold; and
        ceasing iteration through the plurality of iterations if the ratio satisfies the first threshold.

2. The method of claim 1, wherein executing the second test suite against the modified version of the operating platform occurs if none of the first plurality of test cases fails when executing the first test suite against the modified version of the operating platform.

3. The method of claim 1 further comprising adding a test case to the first plurality of test cases when executing the second test suite against the modified version of the operating platform results in at least one of the second plurality of test cases failing.

4. The method of claim 3, wherein adding the test case to the first plurality of test cases occurs prior to performing the next iteration of the plurality of iterations.

5. The method of claim 1 further comprising flagging the selected one of the plurality of software faults if executing the second test suite against the modified version of the operating platform results in at least one of the second plurality of test cases failing.

6. The method of claim 5 further comprising developing a test case based on the flagged selected one of the plurality of software faults.

7. The method of claim 5 further comprising adding a test case to the first plurality of test cases based on the flagged selected one of the plurality of software faults.

8. The method of claim 1, wherein executing the first test suite against the modified version of the operating platform is performed if the first test suite includes at least one test case.

9. The method of claim 1, wherein performing the next iteration is further based on whether a quantity of previously performed iterations fails to satisfy a second threshold.

10. The method of claim 1, wherein the modified version of the operating platform has been created by altering a baseline version of the operating platform to include the selected one of the plurality of software faults.

11. A system for developing a test suite for an operating platform, the system comprising:

a processor; and a memory storing instructions that when executed by the processor, cause the processor to perform a plurality of iterative operations, each of the plurality of iterative operations including:

executing a first test suite against a modified version of the operating platform, the modified version of the operating platform being created by altering a baseline version of the operating platform;

incrementing a first counter if executing the first test suite against the modified version of the operating platform fails;

executing a second test suite against the modified version of the operating platform if the first test suite against the modified version of the operating platform passes;

incrementing a second counter when executing the second test suite against the modified version of the operating platform fails;

incrementing a third counter if executing the second test suite against the modified version of the operating platform passes;

determining a ratio of the first counter to a sum of the second and third counters, performing another of the plurality of iterative operations if the ratio fails to satisfy a first threshold; and ceasing performance of the plurality of iterative operations if the ratio satisfies the first threshold.

12. The system of claim 11, wherein each of the plurality of iterative operations further includes adding a test case to the first test suite if executing the second test suite against the modified version of the operating platform fails.

13. The system of claim 12, wherein adding the test case to the first test suite occurs prior to performing another of the plurality of iterative operations.

14. The system of claim 11, wherein executing the first test suite against the modified version of the operating platform is performed if the first test suite includes at least one test case.

15. The system of claim 11, wherein performing another of the plurality of iterative operations is further based on whether a quantity of previously performed iterative operations of the plurality of iterative operations fails to satisfy a second threshold.

16. The system of claim 11, wherein altering the baseline version of the operating platform is performed by injecting one of a plurality of software faults into the baseline version.

17. The system of claim 16, wherein each of the plurality of iterative operations corresponds to each of the plurality of software faults.

18. A method for creating a test suite for an operating platform, the method comprising:

performing a plurality of iterations corresponding to a plurality of software faults, each of the plurality of iterations corresponding to one of the plurality of software faults, and each of the plurality of iterations including:

creating a modified version of the operating platform by altering a baseline version of the operating platform by injecting a corresponding one of the plurality of software faults into the baseline version of the operating platform;

executing a first test suite against the modified version of the operating platform if the first test suite includes at least one test case;

if executing the first test suite against the modified version of the operating platform fails, incrementing a first counter; and if executing the first test suite against the modified version of the operating platform passes:

executing a second test suite against the modified version of the operating platform;

if executing the second test suite against the modified version of the operating platform fails, incrementing a second counter; and adding a new test case to the first test suite for the corresponding one of the plurality of software faults; and if executing the second test suite against the modified version of the operating platform fails:

if executing the second test suite against the modified version of the operating platform passes, incrementing a third counter;

determining a ratio of the first counter to a sum of the second and third counters;

if the ratio fails to satisfy a first threshold, performing another of the plurality of iterations; and if the ratio satisfies the first threshold, ceasing performance of the plurality of iterations.

19. The method of claim 18 wherein the performing another of the plurality of iterations is further based on whether a quantity of previously performed iterations of the plurality of iterations fails to satisfy a second threshold.

20. The method of claim 19 wherein the second threshold is based on a ratio of the previously performed iterations of the plurality of iterations to a total of the plurality of iterations.

* * * * *